US012687673B2

(12) United States Patent (10) Patent No.: US 12,687,673 B2
Bennett et al. (45) Date of Patent: Jul. 21, 2026

(54) MULTICORE OPTICAL FIBER WITH REDUCED CROSS TALK

(71) Applicant: CORNING INCORPORATED,
Corning, NY (US)

(72) Inventors: Kevin Wallace Bennett,
Hammondsport, NY (US); Douglas Llewellyn Butler, Painted Post, NY (US); Pushkar Tandon, Painted Post, NY (US)

(73) Assignee: CORNING INCORPORATED,
Corning, NY (US)

( * ) Notice: Subject to any disclaimer, the term of this patent is extended or adjusted under 35 U.S.C. 154(b) by 250 days.

(21) Appl. No.: 18/231,967

(22) Filed: Aug. 9, 2023

(65) Prior Publication Data

US 2024/0061167 A1 Feb. 22, 2024

Related U.S. Application Data

(60) Provisional application No. 63/399,420, filed on Aug. 19, 2022.

(51) Int. Cl.
*G02B 6/02* (2006.01)
(52) U.S. Cl.
CPC ................................. *G02B 6/02042* (2013.01)
(58) Field of Classification Search
CPC ............ G02B 6/03611; G02B 6/02042; G02B 6/0281; G02B 6/03627; G02B 6/0365
See application file for complete search history.

(56) References Cited

U.S. PATENT DOCUMENTS

| 9,223,083 | B2 | 12/2015 | Ishida et al. |
| 9,291,768 | B2 | 3/2016 | Ishida et al. |
| 9,529,144 | B2 | 12/2016 | Ishida et al. |
| 9,529,146 | B2 | 12/2016 | Ishida et al. |

(Continued)

FOREIGN PATENT DOCUMENTS

EP 4053606 A1 9/2022

OTHER PUBLICATIONS

International Search Report and Written Opinion of the International Searching Authority; PCT/US2023/030135; dated Oct. 27, 2023; 13 pages; European Patent Office.

*Primary Examiner* — Eric Wong
(74) *Attorney, Agent, or Firm* — Kevin L. Bray

(57) ABSTRACT

A multicore optical fiber including four cores arranged in a linear configuration, the centerline of each core being spaced from the centerline of an adjacent core by a distance x of about 30 microns or less, and each core having a relative refractive index $\Delta_1$. A cladding surrounding each of the four cores, the cladding including an inner cladding region with a relative refractive index $\Delta_2$, a depressed-index cladding region with a relative refractive index $\Delta_3$, and an outer cladding region with a relative refractive index $\Delta_4$, wherein $\Delta_1 > \Delta_2 > \Delta_3$ and $\Delta_1 > \Delta_4 > \Delta_3$. Furthermore, each core of the four cores has a mode field diameter, at a wavelength of 1310 nm, of about 8.1 microns or less, and cross talk between adjacent cores is about −18 dB or less at wavelengths of 1310 nm and 1550 nm per 2 km fiber length.

20 Claims, 4 Drawing Sheets

(56)     References Cited

U.S. PATENT DOCUMENTS

| | | | |
|---|---|---|---|
| 9,625,656 B2 | 4/2017 | Sasaki et al. | |
| 9,891,376 B2 | 2/2018 | Nagashima et al. | |
| 2021/0294024 A1 | 9/2021 | Li et al. | |
| 2022/0026628 A1* | 1/2022 | Bennett | G02B 6/0288 |
| 2022/0066090 A1* | 3/2022 | Tandon | G02B 6/0365 |
| 2022/0283362 A1 | 9/2022 | Bennett et al. | |
| 2023/0152513 A1* | 5/2023 | Bickham | G02B 6/02042 |
| | | | 385/126 |

* cited by examiner

MULTICORE OPTICAL FIBER WITH REDUCED CROSS TALK

This application claims the benefit of priority under 35 U.S.C § 120 of U.S. Provisional Application Ser. No. 63/399,420 filed on Aug. 19, 2022, the content of which is relied upon and incorporated herein by reference in its entirety.

FIELD OF THE DISCLOSURE

This disclosure pertains to optical fibers. More particularly, this disclosure pertains to optical fibers with reduced cross talk between adjacent cores while having single mode operation at both 1310 nm and 1550 nm wavelengths.

BACKGROUND OF THE DISCLOSURE

Multicore optical fibers include a plurality of cores embedded in a cladding matrix. Therefore, the fiber density is increased, making multicore fibers beneficial to overcome cable size limitations and duct congestion issues in passive optical network ("PON") systems. The use of multicore optical fibers is also beneficial in high speed optical interconnects, where there is a need to increase the fiber density to achieve compact high fiber count connectors. In order to have sufficiently high performance, multicore optical fibers must have low cross talk, low dispersion, and large mode field diameter that is matched to standard single mode fibers. By matching the mode field diameter to that of standard single mode fibers, the multicore optical fibers can be easily inserted into a preexisting cable system.

SUMMARY

The multicore fibers disclosed herein are able to achieve the beneficial features of low cross talk between adjacent cores, low dispersion, and sufficiently large mode field diameter. Therefore, the multicore fibers disclosed herein are very useful in high speed optical interconnects (as well as other telecommunication systems). The unique combination of an offset trench combined with core spacing between adjacent cores provides such beneficial features. Furthermore, the optical fibers disclosed herein have low cable cutoff so that the fibers are single mode in both O-band (1260 nm to 1360 nm) and C-band (1530 nm to 1565 nm) frequency ranges while also achieving good cross-talk and attenuation performance in the O-band and C-band wavelengths. The optical fibers are, thus, single mode at both 1310 nm and 1550 nm operation so that the optical fibers can be used with telecommunication sources that operate at these wavelengths without distortion of the signal from modal dispersion.

In aspects, the present disclosure includes a multicore optical fiber comprising four cores arranged in a linear configuration such that a centerline of each core is arranged along axis A, the centerline of each core being spaced from the centerline of an adjacent core by a distance x of about 30 microns or less, and each core having a relative refractive index $\Delta_1$. A cladding surrounds each of the four cores, the cladding comprising an inner cladding region with a relative refractive index $\Delta_2$, a depressed-index cladding region with a relative refractive index $\Delta_3$ and a volume $V_3$ of 20% $\Delta$micron$^2$ or greater, and an outer cladding region with a relative refractive index $\Delta_4$, wherein $\Delta_1 > \Delta_2 > \Delta_3$ and $\Delta_1 > \Delta_4 > \Delta_3$. Furthermore, the multicore optical fiber has an outer diameter of about 125 microns or less, each core of the four cores has a mode field diameter, at a wavelength of 1310 nm, of about 8.1 microns or less, each core of the four cores has a cable cutoff of about 1260 nm or less, and cross talk between adjacent cores of the four cores is about −18 dB or less at wavelengths of 1310 nm and 1550 nm per 2 km fiber length.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
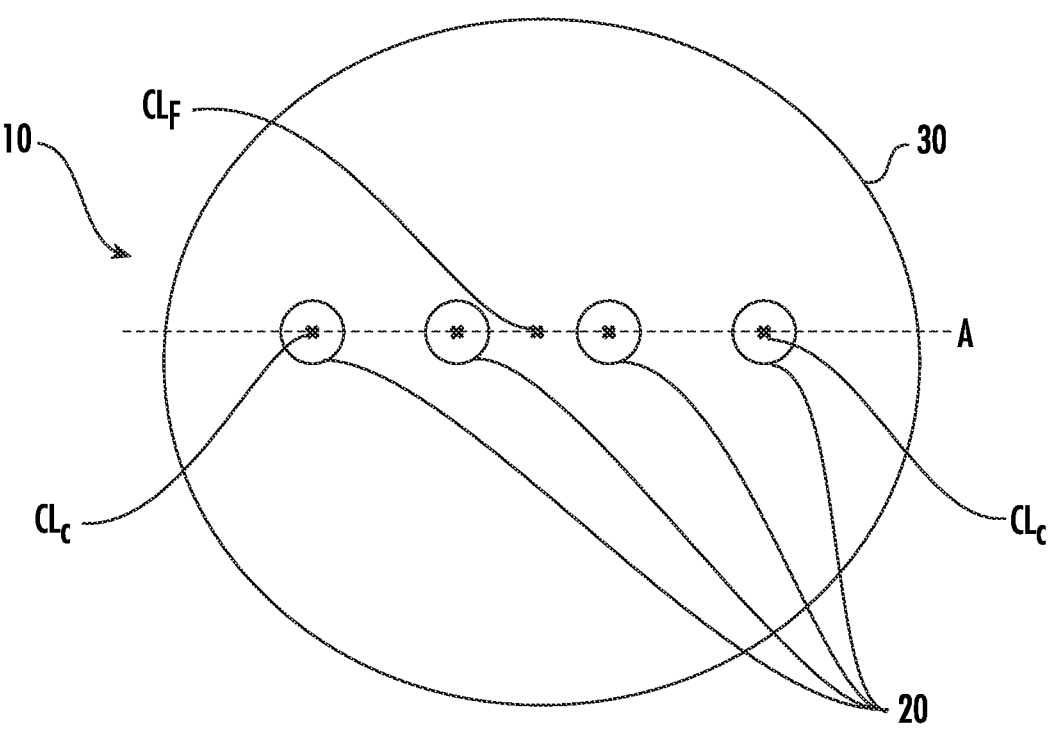
FIG. 1 is a schematic view of a cross-section of an optical fiber with a plurality of cores according to embodiments of the present disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When a relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined below, unless otherwise specified. Whether by design or a consequence of normal manufacturing variability, the dependence of relative refractive index on radial position may be sloped, curved, or otherwise non-constant.

"Relative refractive index," as used herein, is defined as:

$$\Delta_i(r_i)\% = 100\frac{(n_i^2 - n_{ref}^2)}{2n_i^2}$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta\%$ (or "delta %) and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from the following equation:

$$\Delta_{ave} = \int_{r_{inner}}^{r_{outer}} \frac{\Delta(r)dr}{(r_{outer} - r_{inner})}$$

where $r_{inner}$ is the inner radius of the region, $r_{outer}$ is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index n(r) is then used to calculate the relative refractive index as defined above.

The term "$\alpha$-profile" or "alpha profile" refers to a relative refractive index profile $\Delta(r)$ that has the functional form defined in the following equation:

$$\Delta(r) = \Delta(r_0)\left[1 - \left[\frac{|r - r_0|}{(r_z - r_0)}\right]^\alpha\right]$$

where $r_o$ is the radial position at which $\Delta(r)$ is maximum, $\Delta(r_0)>0$, $r_z>r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{imax}$. When the relative refractive index profile of the fiber core region is described by an $\alpha$-profile with $r_0$ occurring at the centerline (r=0), $r_z$ corresponding to the outer radius $r_1$ of the core region, and $\Delta_1(r_1)=0$, the above equation simplifies to:

$$\Delta_1(r) = \Delta_{1max}\left[1 - \left[\frac{r}{r_1}\right]^\alpha\right]$$

Figure 3:
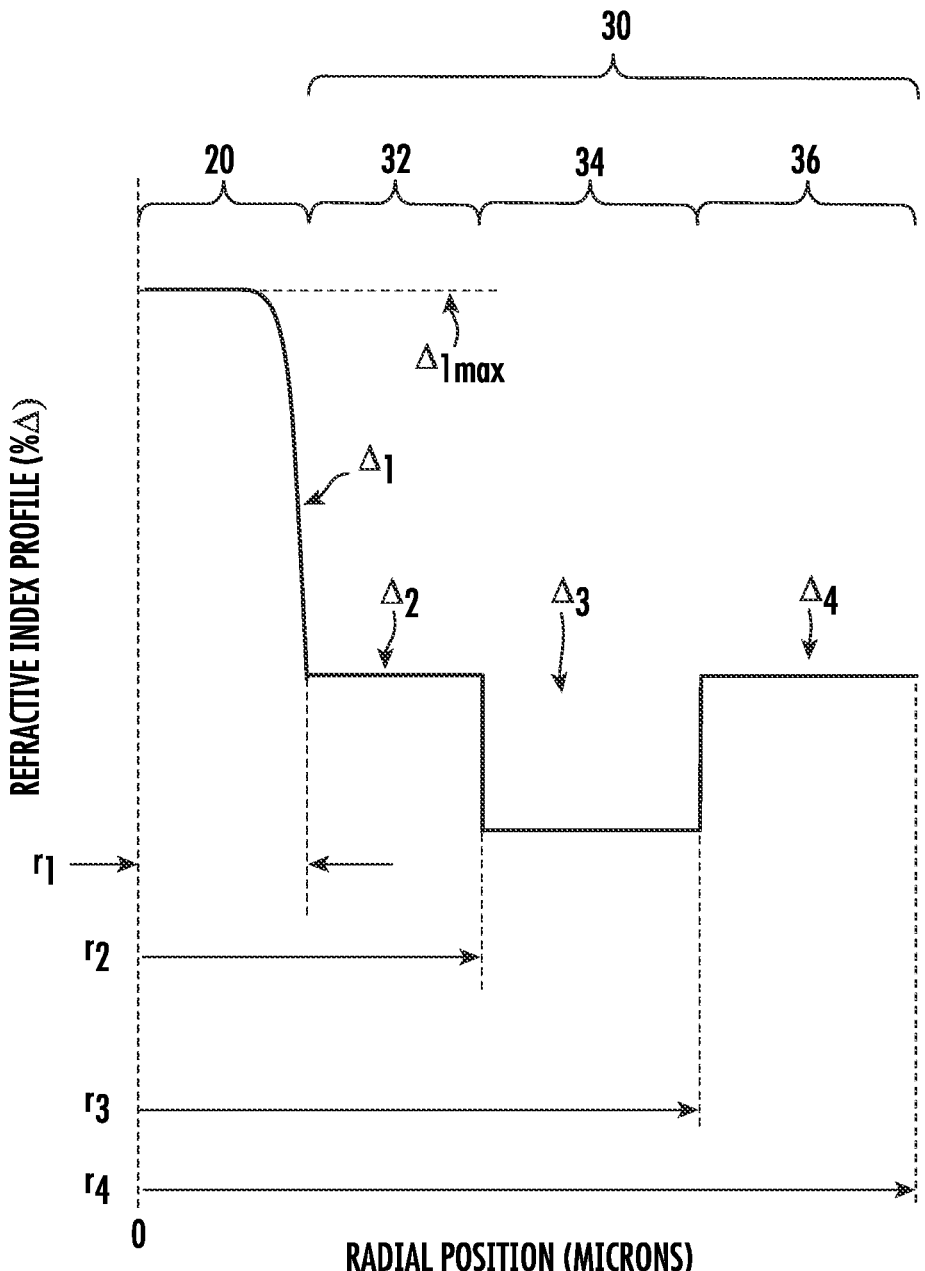
FIG. 3 depicts a relative refractive index profile of an optical fiber according to embodiments of the present disclosure.

When the core region has an index described by the above equation, the outer radius $r_1$ can be determined from the measured relative refractive index profile by the following procedure. Estimated values of the maximum relative refractive index $\Delta_{1max}$, $\alpha$, and outer radius $r_{1est}$ are obtained from inspection of the measured relative refractive index profile and used to create a trial function $\Delta_{trial}$ between $r=-r_{1est}$ and $r=_{1est}$. A relative refractive index profile of a representative glass fiber having cores described by an $\alpha$-profile, in accordance with embodiments of the present disclosure, is shown in FIG. 3.

"Trench volume" is defined as:

$$V_{Trench} = \left|2\int_{r_{Trench,inner}}^{r_{Trench,outer}} \Delta_{Trench}(r)rdr\right|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of $\% \, \Delta micron^2$, $\% \, \Delta\text{-}micron^2$, $\% \, \Delta\mu m^2$, or $\% \, \Delta\mu m^2$, whereby these units can be used interchangeably herein. A trench region is also referred to herein as a depressed-index cladding region and trench volume is also referred to herein as $V_3$, $V_4$, or $V_{4a}$.

The "mode field diameter" or "MFD" of an optical fiber is defined in the following equation as:

$$MFD = 2w$$

$$w^2 = 2\frac{\int_0^\infty (f(r))^2 r \, dr}{\int_0^\infty \left(\frac{df(r)}{dr}\right)^2 r \, dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in the following equation as:

$$A_{eff} = \frac{2\pi \left[\int_0^\infty (f(r))^2 r \, dr\right]^2}{\int_0^\infty (f(r))^4 r \, dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

"Cable cutoff wavelength," or "cable cutoff," as used herein, refers to the 22 m cable cutoff test as specified by the IEC 60793-1-44 standard, "Measurement methods and test procedures—Cut-off wavelength."

The optical fibers disclosed herein include a plurality of core regions, a cladding region surrounding the core region, and a coating surrounding the cladding region. The core region and cladding region are glass. The cladding region includes multiple regions. The multiple cladding regions are preferably concentric regions. The cladding region includes at least an inner cladding region, a depressed-index cladding region, and an outer cladding region. The inner cladding region surrounds and is directly adjacent to the core region. The depressed-index cladding region surrounds and is directly adjacent to the inner cladding region such that the inner cladding region is disposed between the core region and the depressed-index cladding region in a radial direction. The outer cladding region surrounds and is directly adjacent to the depressed-index cladding region such that the depressed-index cladding is disposed between the inner cladding region and the outer cladding region in a radial direction.

The depressed-index cladding region has a lower relative refractive index than each of the inner cladding region and the outer cladding region. The relative refractive index of the inner cladding region may be less than, equal to, or greater than the relative refractive index of the outer cladding region. The depressed-index cladding region may be referred to herein as a trench or trench region. Furthermore, as discussed further below, the depressed-index cladding region and the inner cladding region contribute to a reduction in cross talk between adjacent cores.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, and radial position $r_4$ and relative refractive index $\Delta_4$ or $\Delta_4(r)$ refer to the outer cladding region. Additionally, a radial position $r_5$ (not shown) refers to a primary coating, radial position $r_6$ (not shown) refers to a secondary coating, and the radial position $r_7$ (not shown) refers to an optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, primary coating, and secondary coating are substantially annular in shape. Annular regions are characterized in terms of an inner radius and an outer radius. Radial positions $r_1$, $r_2$, $r_3$, $r_4$, $r_5$, $r_6$, and $r_7$ refer herein to the outermost radii of the core region, inner cladding region, depressed-index cladding region, outer cladding region, primary coating, secondary coating, and tertiary coating, respectively. The radius $r_6$ also corresponds to the outer radius of the optical fiber in embodiments without a tertiary coating. When a tertiary coating is present, the radius $r_7$ corresponds to the outer radius of the optical fiber.

The difference between radial position $r_2$ and radial position $r_1$ is the thickness of the inner cladding region. The difference between radial position $r_3$ and radial position $r_2$ is the thickness of the depressed-index cladding region. The difference between radial position $r_4$ and radial position $r_3$ is the thickness of the outer cladding region. The difference between radial position $r_5$ and radial position $r_6$ is the thickness of the primary coating. The difference between radial position $r_6$ and radial position $r_7$ is the thickness of the secondary coating.

With reference to FIG. 1, embodiments of the present disclosure are directed to a multicore optical fiber 10 that comprises a plurality of cores 20 surrounded by a cladding 30. As discussed further below, an outer coating may surround cladding 30. Cladding 30 can also be referred to herein as a "glass matrix." An outer diameter of cladding 30 is about 180 microns or less, or about 160 microns or less, or about 150 microns or less, or about 125 microns or less, or about 100 microns or less, or about 90 microns or, or about 80 microns or less. In embodiments, the outer diameter of cladding 30 is in a range from about 80 microns to about 180 microns, or from about 90 microns to about 160 microns, or from about 100 microns to about 150 microns, or from about 125 microns to about 150 microns. The outer diameter of cladding 30 may be the outer diameter of optical fiber 10 (without any additional coating layers disposed on cladding 30). As shown in FIG. 1, cladding 30 is circular in cross-section. However, it is also contemplated that cladding 30 may comprise other cross-sectional shapes.

Cores 20 are each a glass core. Optical fiber 10 may comprise a plurality of cores 20, such as, for example, 2 or more, or 4 or more, or 6 or more, or 8 or more, or 10 or more, or 12 or more cores. The cores may be arranged in a variety of arrangements, including linear and square configurations. In some embodiments, at least two cores of the plurality of cores are arranged so that a centerline of the cores are positioned along the same axis. In yet some other embodiments, at least two cores of the plurality of cores are arranged so that the centerline of the cores are positioned along the same axis and such that a centerline of optical fiber 10 is also positioned along the same axis. The centerline $CL_C$ of each core defines the radial position r=0 for the core, and the centerline $CL_F$ for optical fiber 10 defines the radial position r=0 for the fiber.

In the embodiment of FIG. 1, cores 20 are arranged in a 1×4 linear configuration such that the four cores are all disposed in a single row along the same axis A. More specifically, in the embodiment of FIG. 1, cores 20 are all arranged such that a centerline $CL_C$ of each core is positioned along axis A and such that a centerline $CL_F$ of optical fiber 10 is also positioned on axis A. Therefore, the centerline $CL_F$ of optical fiber 10 is aligned with the centerline $CL_C$ of cores 20. Such a 1×4 linear configuration is advantageous so that optical fiber 10 can be directly coupled to transmission and receiver sources without requiring fan-in or fan-out devices. However, it is also noted that cores 20 may be arranged in other configurations and patterns. For example, in other embodiments, cores 20 may be arranged in a 2×2 square configuration. In yet other embodiments, optical fiber 10 may comprise 6 cores arranged in a 1×6 linear configuration.

In some other embodiments, optical fiber 10 comprises 4 cores 20 arranged in a 1×4 configuration. However, in this embodiment, the centerline $CL_C$ of at least one core is positioned along axis A while a centerline $CL_C$ of at least one other core is not positioned along axis A. Therefore, in this embodiment, at least one core is slightly offset from another core.

Each core 20 has a higher refractive index than cladding 30 such that optical fiber 10 functions as a waveguide. In embodiments, cores 20 and cladding 30 are configured so that guided light within optical fiber 10 is single mode at an operating wavelength (i.e., the cutoff wavelength of each core is lower than the operating wavelength). The operating wavelength is 1310 nm and 1550 nm in embodiments. It is also contemplated in other embodiments that at least some cores 20 are configured to support multiple guided modes at an operating wavelength.

In some embodiments, cores 20 each lack a discernible boundary with cladding 30. Alternatively, a distinct boundary is present between cores 20 and cladding 30.

Figure 2:
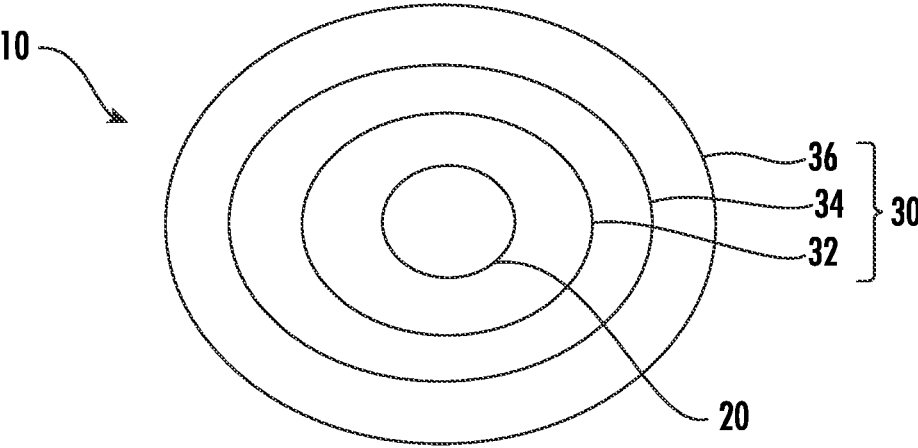
FIG. 2 is a schematic view of an enlarged cross-section of a single core of an optical fiber according to embodiments of the present disclosure.

As shown in FIG. 2, cladding 30 may comprise an inner cladding region 32, a depressed-index cladding region 34, and an outer cladding region 36 surrounding each core 20. Although FIG. 2 only depicts one core 20, it is also contemplated that each core 20 in optical fiber 10 is surrounded by the same cladding regions 32, 34, 36. And, as discussed further below, outer cladding region 36 may be a common cladding that surrounds all the cores.

FIG. 3 is a plot of an idealized relative refractive index profile of optical fiber 10 as the relative refractive index Δ versus the radial coordinate r, according to embodiments of the present disclosure. Core 20 has relative refractive index $\Delta_1$, with a maximum refractive index of $\Delta_0 = \Delta_{1MAX}$ at r=0; and a gradient α-profile, which is described in greater detail below. Inner cladding region 32 has a relative refractive index $\Delta_2$ and a radius $r_2$. Depressed-index cladding region 34 can be in the form of a depressed region or a trench and has a radius $r_3$ and a relative refractive index $\Delta_3$. Outer cladding region 36 has a radius $r_4$ and a relative refractive index $\Delta_4$. Furthermore, as shown by way of example, $\Delta_3 < \Delta_2$ and $\Delta_3 < \Delta_4$. Other configurations for the relative refractive index profile are discussed further below.

Core

Core 20 comprises silica glass that is either un-doped silica glass, up-doped silica glass, and/or down-doped silica glass. Up-doped silica glass includes silica glass doped with, for example, germanium (e.g., $GeO_2$), phosphorus (e.g., $P_2O_5$), aluminum (e.g. $Al_2O_3$), chlorine, or an alkali metal oxide (e.g. $Na_2O$, $K_2O$, $Li_2O$, $Cs_2O$, or $Rb_2O$). In some embodiments, the core comprises germanium doped glass having a germanium concentration between about 5 wt. % and about 10 wt. %. In embodiments where the core is doped with an alkali dopant, the peak concentration of the alkali in the silica glass may range from about 10 ppm to about 500 ppm, or from about 30 ppm to about 400 ppm. In yet other embodiments, the silica glass of core 20 is free of germanium and/or chlorine; that is the core region comprises silica glass that lacks germanium and/or chlorine.

Down-doped silica glass includes silica glass doped with, for example, fluorine or boron.

As discussed above, the relative refractive index of each core 20 is described by an α-profile with an α value that is in a range of about 7.0 or less, or about 6.0 or less, or about 5.0 or less, or about 4.0 or less, or about 3.0 or less, or about 2.0 or less, or about 1.0 or less. In some other embodiments, the α value is about 8.0 or greater, or about 9.0 or greater, or about 10.0 or greater, or about 11.0 or greater, or about 12.0 or greater, or about 13.0 or greater. In some embodiments, the core α value is about 10, or about 12, or about 20.

The outer radius $r_1$ of core 20 is in a range from about 2.5 microns to about 7.0 microns, or about 3.0 microns to about 6.5 microns, or about 3.5 microns to about 5.0 microns, or about 4.0 microns to about 4.5 microns, or about 3.0 microns to about 3.5 microns. In some embodiments, the outer radius $r_1$ is about 3.0 microns, or about 3.2 microns, or about 3.3 microns, or about 3.6 microns, or about 4.0 microns, or about 4.2 microns, or about 4.4 microns.

The maximum relative refractive index $\Delta_{1max}$ of core 20 is in a range from about 0.80% or less, or about 0.75% or less, or about 0.70% or less, or about 0.65% or less, or about 0.60% or less, or about 0.55% or less, or about 0.50% or less, or about 0.45% or less, or about 0.40% or less, or about 0.35% or less, or about 0.30% or less, or about 0.25% or less. Additionally or alternatively, the maximum relative refractive index $\Delta_{1max}$ of core 20 is about 0.20% or greater, or about 0.25% or greater, or about 0.30% or greater, or about 0.35% or greater, or about 0.40% or greater, or about 0.45% or greater, or about 0.50% or greater, or about 0.55% or greater, or about 0.60% or greater, or about 0.65% or greater, or about 0.70% or greater, or about 0.75% or greater. In some embodiments, the maximum relative refractive index $\Delta_{1max}$ is about 0.35%, or about 0.40%, or about 0.52%, or about 0.57%, or about 0.60%, or about 0.65%, or about 0.70%.

Although not depicted in FIG. 3, in some embodiments, the relative refractive index of core 20 may have a centerline dip such that the maximum refractive index of core 20 and the maximum refractive index of the entire optical fiber 10 is located a small distance away from the centerline of core 20 rather than at the centerline of core 20, as depicted in FIG. 3.

It is noted that one or more cores 20 in optical fiber 10 may be different from one or more other cores 20. For example, one or more cores 20 may have a different refractive index profile and/or radius from one or more other cores 20. Furthermore, FIGS. 1 and 2 depict cores 20 as being circular in cross-sectional shape. However, one or more cores 20 may have other cross-sectional shapes, such as oval, rectangular, square, or D-shape.

Inner Cladding Region

Inner cladding region 32 may be comprised of un-doped silica glass. In some other embodiments, inner cladding 32 is up-doped or down-doped. The inner radius of inner cladding region 32 is $r_1$, as discussed above. The outer radius $r_2$ of inner cladding region 32 is in a range from about 6.0 microns to about 14.0 microns, or about 6.5 microns to about 13.5 microns, or about 7.0 microns to about 13.0 microns, or about 7.5 microns to about 12.5 microns, or about 8.0 microns to about 12.0 microns. In some embodiments, the outer radius $r_2$ is about 7.14 microns, or about 7.46 microns, or about 8.0 microns, or about 8.5 microns, or about 8.8 microns, or about 9.14 microns, or about 10.2 microns, or about 10.56 microns.

The relative refractive index $\Delta_2$ of inner cladding region 32 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_2$ is about 0.0%. The relative refractive index $\Delta_2$ is preferably constant or approximately constant.

Inner cladding region 32 helps to confine the light in each core 20 as it transmitted along optical fiber 10, thus reducing cross talk between adjacent cores 20.

Depressed-Index Cladding Region

Depressed-index cladding region 34 comprises down-doped silica glass. In some embodiments, depressed-index cladding region 34 is down-doped with fluorine or boron.

The inner radius of depressed-index cladding region 34 is $r_2$, as discussed above. The outer radius $r_3$ of depressed-index cladding region 34 is in a range from about 8.0 microns to about 20.0 microns, or about 10.0 microns to about 19.0 microns, or about 12.0 microns to about 18.0 microns. In some embodiments, the outer radius $r_3$ is about 10.2 microns, or about 12.0 microns, or about 12.3 microns, or about 13.0 microns, or about 13.1 microns.

In some embodiments, depressed-index cladding region 34 is a depressed-index cladding region that forms a trench design. A "volume" $V_3$ of depressed-index cladding region 34 is defined as:

$$V_3 = 2 \int_{r2}^{r3} \Delta_{3-4} r \, dr$$

where $\Delta_{3-4} = (\Delta_3(r) - \Delta_4)$.

The trench volume $V_3$ of depressed-index cladding region 34 is about 20.0% $\Delta$-micron$^2$ or greater, or about 25.0% $\Delta$-micron$^2$ or greater, or about 30.0% $\Delta$-micron$^2$ or greater, or about 35.0% $\Delta$-micron$^2$ or greater, or about 40.0% $\Delta$-micron$^2$ or greater, or about 45.0% $\Delta$-micron$^2$ or greater, or about 50.0% $\Delta$-micron$^2$ or greater, or about 55.0% $\Delta$-micron$^2$ or greater, or about 60.0% $\Delta$-micron$^2$ or greater. In embodiments, the trench volume $V_3$ of depressed-index cladding region 34 is about 20.0% $\Delta$-micron$^2$ to about 80.0% $\Delta$-micron$^2$, or about 30.0% $\Delta$-micron$^2$ to about 70.0% $\Delta$-micron$^2$, or about 35.0% $\Delta$-micron$^2$ to about 65.0% $\Delta$-micron$^2$, or about 40.0% $\Delta$-micron$^2$ to about 60.0% $\Delta$-micron$^2$. In some embodiments, the trench volume $V_3$ is about 50.9% $\Delta$-micron$^2$, or about 51.0% $\Delta$-micron$^2$, or about 53.3% $\Delta$-micron$^2$, or about 56.13% $\Delta$-micron$^2$, or about 57.0% $\Delta$-micron$^2$, or about 62.1% $\Delta$-micron$^2$.

The transition regions from inner cladding region 32 to depressed-index cladding region 34 and from depressed-index cladding region 34 to outer cladding region 36 are shown as step changes in FIG. 3. However, it is to be understood that such step changes are an idealization and that the transition regions may not be strictly vertical in practice. Instead, the transition regions may have a slope or curvature.

Outer Cladding Region

Outer cladding region 36 may be comprised of un-doped silica glass. In some other embodiments, outer cladding 36 is up-doped or down-doped. The inner radius of outer cladding region 36 is $r_3$, as discussed above. The outer radius $r_4$ of outer cladding region 36 is in a range from about 40.0 microns to about 65 microns, or from about 45.0 microns to about 62.5 microns, or from about 50.0 microns to about 60.0 microns, or from about 52.5 microns to about 57.5 microns. In some embodiments, the outer radius $r_4$ of outer cladding region 36 is about 62.5 microns.

The relative refractive index $\Delta_4$ of outer cladding region 36 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_4$ is about 0.0%. The relative refractive index $\Delta_4$ is preferably constant or approximately constant. Furthermore, is some embodiments, the relative refractive index $\Delta_4$ is equal to or substantially equal to the relative refractive index $\Delta_2$.

As discussed above, outer cladding region 36 may be an outer cladding that is common to all cores 20 in optical fiber 10. Thus, outer cladding region 36 may surround each core 20 in optical fiber 10.

Outer Coatings

Figure 4:
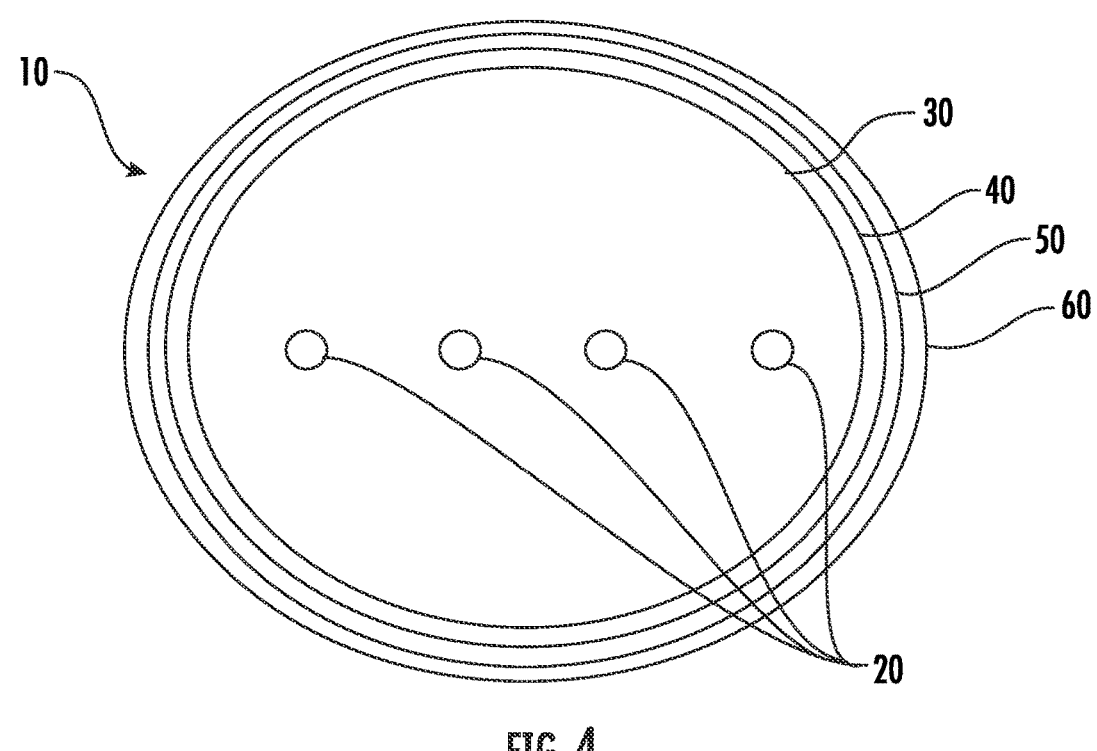
FIG. 4 is a schematic view of a cross-section of an optical fiber with outer coatings according to embodiments of the present disclosure.

One or more coatings may be disposed on an outer surface of cladding 30. For example, as shown in FIG. 4, in some embodiments, a primary coating 40 immediately surrounds cladding 30, and a secondary coating 50 immediately surrounds primary coating 40. Primary coating 40 may comprise a low modulus material and secondary coating 50 may comprise a high modulus material. One or more of the materials may be, for example, acrylate.

Optical fiber 10 may further include a tertiary coating 60 that surrounds secondary coating 50. Tertiary coating 60 may include pigments, inks, or other coloring agents to mark the optical fiber for identification purposes, and tertiary coating typically has a Young's modulus similar to the Young's modulus of secondary coating 50.

An outer diameter of secondary coating 50 is an outer diameter of optical fiber 10, when a tertiary layer is not applied. The outer diameter of secondary coating 50 may be about 250 microns or less, or about 220 microns or less, or about 210 microns or less, or about 200 microns or less, or about 190 microns or less, or about 180 microns or less, or about 170 microns or less.

Core Spacing

Figure 5:
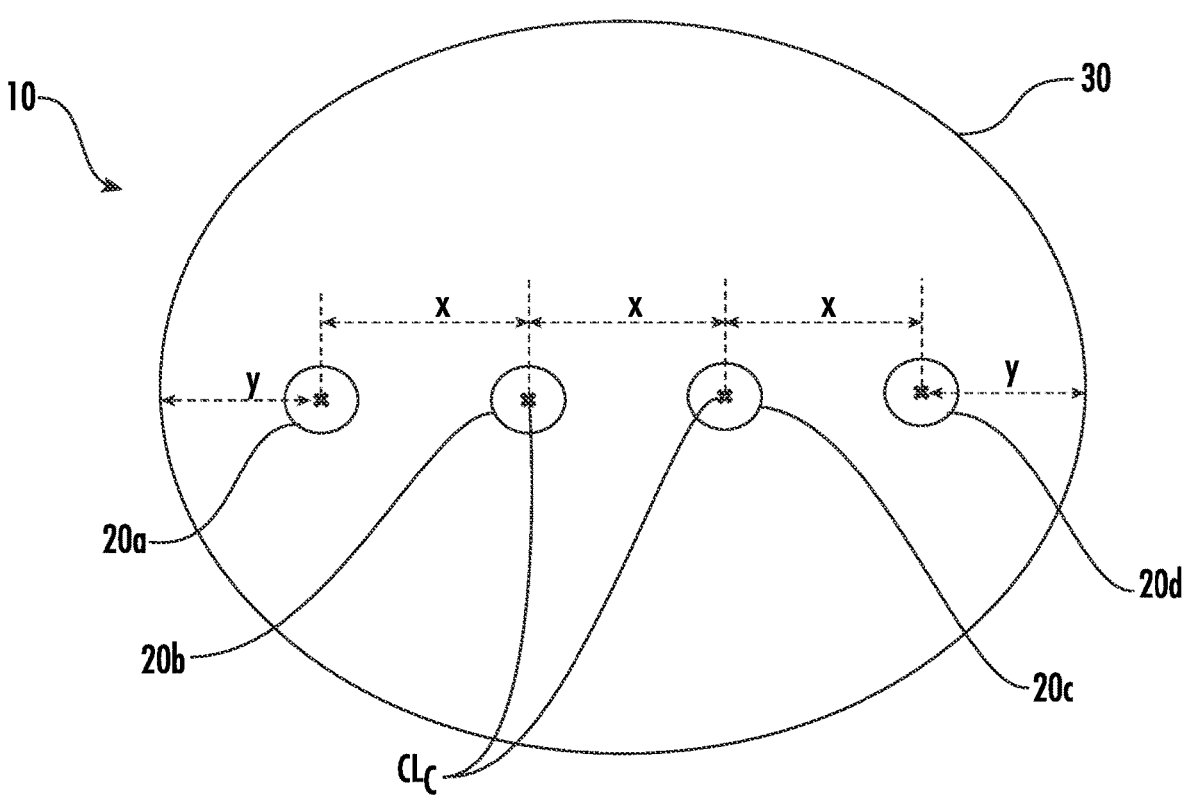
FIG. 5 is another schematic view of a cross-section of an optical fiber according to embodiments of the present disclosure.

As shown in FIG. 5, adjacent cores 20 are spaced apart from each other by a distance x. More specifically, a centerline $CL_C$ of a first core is spaced apart from a centerline $CL_C$ of an adjacent second core by distance x. Therefore, distance x is the center-to-center spacing between adjacent cores. In the embodiment of FIG. 5, cores 20a-d are arranged in a 1×4 linear configuration such that the centerline $CL_C$ of cores 20a-d are each separated from the centerline $CL_C$ of an adjacent core by distance x. In embodiments, distance x is about 35 microns or less, or about 30 microns or less, or about 29 microns or less, or about 28 microns or less, or about 27 microns or less, or about 26 microns or less, or about 25 microns or less, or about 24 microns or less, or about 22 microns or less, or about 20 microns or less. In embodiments, distance x is in a range from about 15 microns to about 35 microns, or from about 20 microns to about 30 microns, or from about 22 microns to about 28 microns, or from about 24 microns to about 26 microns, or from about 24 microns to about 30 microns. In some embodiments, distance x is about 24 microns, or about 26 microns, or about 27 microns. It is also contemplated that a first set of cores may be spaced apart by a different distance than a second set of cores. For example, with reference to FIG. 5, cores 20a and 20b may be spaced apart a first distance (distance x-1) and cores 20b and 20c may be spaced apart a second distance (distance x-2) such that the first distance is not equal to the second distance (x-1≠x-2).

As also shown in FIG. 5, a minimum distance between the centerline $CL_C$ of the outermost cores 20 and an outer diameter of cladding 30 may be a distance y. Therefore, in the example of FIG. 5, the centerline $CL_C$ of outermost cores 20a and 20d are spaced a minimum distance y from the outer diameter of cladding 30. In embodiments, distance y is in a range from about 15 microns to about 30 microns, or about 20 microns to about 28 microns, or about 22 microns to about 26 microns, or about 20 microns to about 25 micros, or about 22 microns to about 24 microns. In some embodiments, distance y is about 23.5 microns, or about 24 microns or about 24.5 microns, or about 25 microns. It is also contemplated that a first core may be spaced from the outer diameter of cladding 30 by a different distance than a second core. For example, with reference to FIG. 5, core 20a may be spaced apart a first distance from the outer diameter of cladding 30 (distance y-1) and core 20d may be spaced apart a second distance from the outer diameter of cladding 30 (distance y-2) such that the first distance is not equal to the second distance (y-1≠y-2).

Marker

Figure 6:
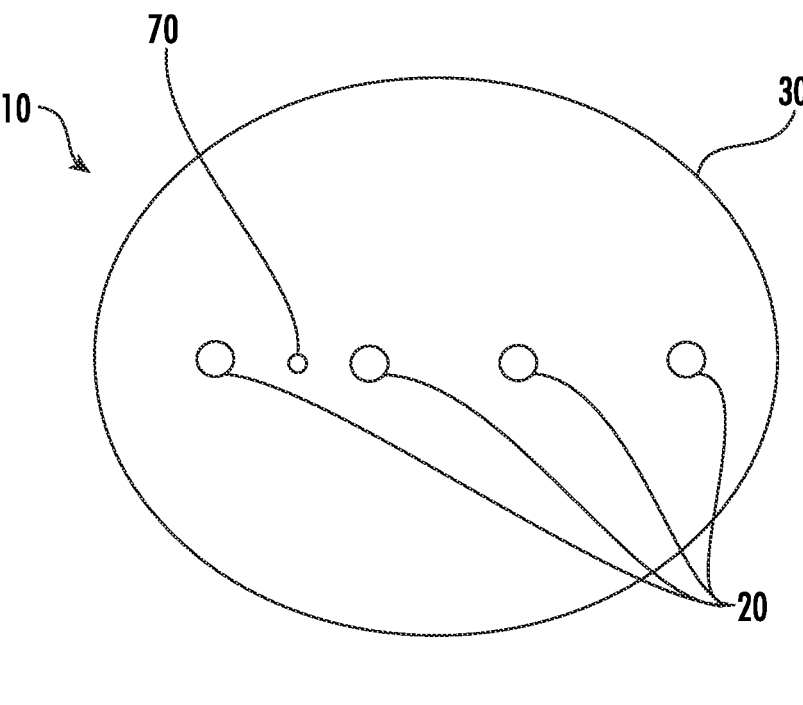
FIGS. 6 and 7 are each a schematic view of a cross-section of an optical fiber with a marker according to embodiments of the present disclosure.

As shown in FIG. 6, a marker 70 may be disposed in cladding 30 to mark, for example, one or two cores 20. For example, marker 70 may be used to identify the relative location of a "first core" within optical fiber 10. The other cores may then be identified based upon their relative position to the "first core." Therefore, in embodiments, marker 70 is disposed in cladding 30 at a position to clearly identify the "first core." It is noted that a first end of an optical fiber is a mirror image of the second end of the optical fiber. Placing marker 70 at a centerline of the optical fiber may not be useful to distinguish between the different cores. More specifically, with reference to FIG. 6, placing maker 70 at a centerline of optical fiber 10 between the center two cores is not useful to distinguish between these two cores, as the core in the middle-right position is in the middle-left position at the opposite end of the fiber. Therefore, in embodiments, marker 70 is not disposed at the centerline $CL_F$ of optical fiber 10.

Figure 7:
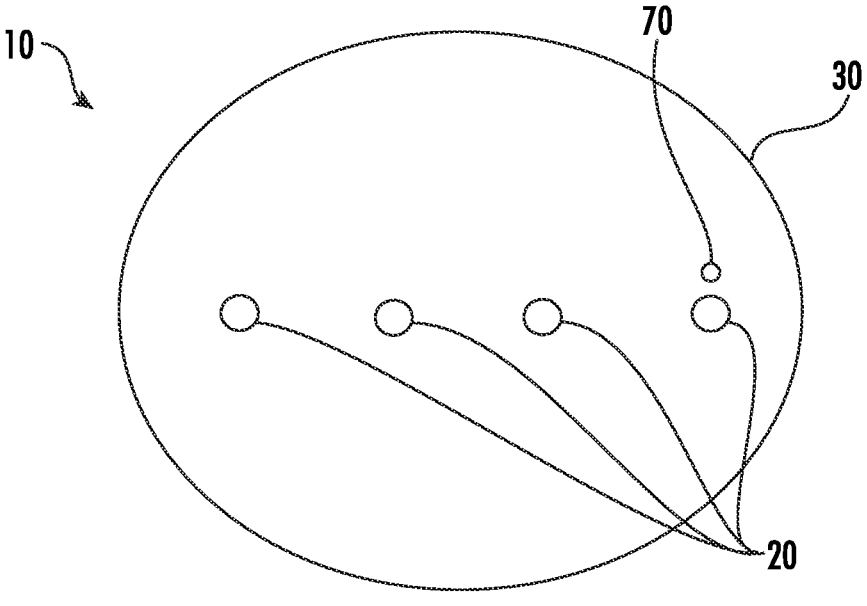

In the embodiment of FIG. 6, marker 70 is disposed equidistantly between the centerlines $CL_C$ of two adjacent cores 20 such that at least one of these adjacent cores is an outer core. Therefore, in this embodiment, the outer core near marker 70 may be identified as the "first core." However, it is also contemplated that marker 70 may be disposed in other locations within cladding 30 with preference given to locations that are not on a line of symmetry of the fiber so as to uniquely identify a core regardless of which mirror image end of the fiber is being viewed. For example, as shown in FIG. 7, marker 70 is disposed closest to a particular core 20 to mark that particular core as the "first core." It is noted that marker 70 in FIG. 6 and in FIG. 7 is not located on a line of symmetry of fiber 10. Marker 70 can comprise doped silica glass such that marker 70 has a relative refractive index $\Delta_5$ that is not equivalent to the relative refractive index of cladding 30 ($\Delta_5 \neq \Delta_4$). In some embodiments, the silica glass of marker 70 is doped with a down-dopant such that marker 70 forms a trench region in cladding 30. In other embodiments, marker 70 is up-doped with, for example, germanium.

Properties

Without intending to be limited by theory, the combination of the offset trench of depressed-index cladding 34 along with the core spacing distance between adjacent cores provides low cable cutoff and low cross talk. Therefore, the optical fibers disclosed herein provide single mode operation in both O-band (1260 nm to 1360 nm) and C-band (1530 nm to 1565 nm) frequency ranges. The optical fibers produced herein are, thus, single mode at both 1310 nm and 1550 nm operation so that the optical fibers can be used with telecommunication sources that operate at these wavelengths without distortion of the signal from modal dispersion.

In particular, the cable cutoff of the optical fibers produced herein is about 1300 nm or less, or about 1260 nm or less, or about 1250 nm or less, or about 1240 nm or less, or about 1230 nm or less, or about 1220 nm or less, or about 1210 nm or less, or about 1205 nm or less, or about 1200 nm or less, or about 1195 nm or less, or about 1190 nm or less, or about 1185 nm or less, or about 1180 nm or less, or about 1175 nm or less, or about 1170 nm or less. For example, the cable cutoff is about 1189 nm, or about 1216 nm, or about 1219 nm, or about 1221 nm, or about 1228 nm, or about 1232 nm.

The cross talk between adjacent cores in the optical fibers produced herein at 1310 nm is less than about –35 dB per 2 km length of fiber. In embodiments, the cross talk between adjacent cores at 1310 nm is less than about –40 dB, or less than about –45 dB, or less than about –50 dB, or less than about –60 dB, or less than about –65 dB, or less than about –70 dB, or less than about –75 dB, per 2 km length of fiber. Additionally or alternatively, in some embodiments, the cross-talk between adjacent cores at 1310 nm is greater than –80 dB per 2 km length of fiber.

The cross talk between adjacent cores in the optical fibers produced herein at 1550 nm is less than about –15 dB per 2 km length of fiber. In embodiments, the cross talk between adjacent cores at 1550 nm is less than about –20 dB, or less than about –25 dB, or less than about –30 dB, or less than about –35 dB, or less than about –40 dB, or less than about –45 dB, per 2 km length of fiber. Additionally or alternatively, in some embodiments, the cross-talk between adjacent cores at 1310 nm is greater than −50 dB per 2 km length of fiber.

Therefore, the optical fibers produced herein have low cable cutoff and low cross talk at both 1310 nm and at 1550 nm. In some embodiments, the cross talk between adjacent cores in the optical fibers produced herein is about −10 dB or less at wavelengths of both 1310 nm and 1550 per 2 km fiber length. In yet other embodiments, the cross talk between adjacent cores is about −15 dB or less, or about −18 dB or less, or about −20 dB or less, or about −22 dB or less, or about −24 dB or les, or about −25 dB or less, or about −28 dB or less, or about −30 dB or less, or about −32 dB or less, or about −34 dB or less, or about −35 dB or less, or about −38 dB or less, or about −40 dB or less, or about −42 dB or less, or about −44 dB or les, or about −45 dB or less, or about −48 dB or less, or about −50 dB or less, or about −52 dB or less, or about −54 dB or les, or about −55 dB or less, or about −58 dB or less, or about −60 dB or less at wavelengths of both 1310 nm and 1550 per 2 km fiber length.

In addition to the low cable cutoff and low cross talk disclosed above, each core 20 disclosed herein has a mode field diameter, at 1310 nm wavelength, of about 6.0 microns or greater, or about 6.2 microns or greater, or about 6.4 microns or greater, or about 6.5 microns or greater, or about 6.6 microns or greater, or about 6.8 microns or greater, or about 7.0 microns or greater, or about 7.25 microns or greater, or about 7.5 microns or greater, or about 7.75 microns or greater, or about 8.0 microns or greater. Additionally or alternatively, each core 20 has a mode field diameter, at 1310 nm wavelength, of about 9.0 microns or less, or about 8.5 microns or less, or about 8.4 micros or less, or about 8.2 microns or less, or about 8.1 microns or less, or about 8.0 microns or less, or about 7.8 microns or less, or about 7.6 microns or less, or about 7.4 microns or less, or about 7.2 microns or less, or about 7.0 microns or less. In some embodiments, the mode field diameter, at 1310 nm wavelength, is in a range from about 5.0 microns to about 9.0 microns, or about 5.0 microns to about 8.4 microns, or about 5.0 micros to about 8.2 microns, or about 8.0 microns to about 8.0 microns, or about 5.0 microns to about 7.8 microns, or about 6.2 microns to about 7.75 microns.

The cores 20 disclosed herein each have a mode field diameter, at 1550 nm wavelength, of about 6.0 microns or greater, or about 6.25 microns or greater, or about 6.5 microns or greater, or about 6.75 microns or greater, or about 7.0 microns or greater, or about 7.25 microns or greater, or about 7.5 microns or greater, or about 7.75 microns or greater, or about 8.0 microns or greater, or about 8.25 microns or greater, or about 8.5 microns or greater, or about 8.75 microns or greater, or about 9.0 microns or greater. Additionally or alternatively, each core 20 has a mode field diameter, at 1550 nm wavelength, of about 9.75 microns or less, or about 9.5 microns or less, or about 9.4 microns or less, or about 9.2 microns or less, or about 9.0 microns or less, or about 8.8 microns or less, or about 8.75 microns or less, or about 8.6 microns or less, or about 8.5 microns or less, or about 8.4 microns or less, or about 8.2 microns or less, or about 8.0 microns or less, or about 7.8 microns or less, or about 7.75 microns or less, or about 7.6 microns or less. In some embodiments, each core 20 has a mode field diameter, at 1550 nm wavelength, with a range from about 6.0 microns to about 9.6 microns, or about 6.0 microns to about 9.4 microns, or about 6.0 microns to about 9.2 microns, or about 6.0 microns to about 9.0 microns, or about 6.0 microns to about 8.8 microns, or about 6.0 microns to about 8.75 microns, or about 6.0 microns to about 8.6 microns, or about 6.5 microns to about 9.6 microns, or about 6.5 microns to about 9.4 microns.

Furthermore, the optical fibers disclosed herein have an effective area, at 1310 nm wavelength, of about 55.0 micron$^2$ or less, or about 50.0 micron$^2$ or less, or about 45.0 micron$^2$ or less, or about 40.0 micron$^2$ or less, or about 35.0 micron$^2$ or less, or about 30.0 micron$^2$ or less. The optical fibers also have an effective area, at 1550 nm wavelength, of about 30 micron$^2$ or greater, or about 35 micron$^2$ or greater, or about 40 micron$^2$ or greater, or about 45 micron$^2$ or greater, or about 50 micron$^2$ or greater. Additionally or alternatively, the effective area, at 1550 nm wavelength, is about 70 micron$^2$ or less, or about 65 micron$^2$ or less, or about 60 micron$^2$ or less. In some embodiments, the effective area, at 1550 nm wavelength, is in range between 30 micron$^2$ and about 70 micron$^2$.

The cores 20 disclosed herein each have zero dispersion wavelength of about 1380 nm or less, or about 1370 nm or less, or about 1360 nm or less, or about 1350 nm or less, or about 1345 nm or less, or about 1340 nm or less, or about 1335 nm or less, or about 1330 nm or less, or about 1325 nm or less, or about 1320 nm or less, or about 1315 nm or less, or about 1310 nm or less, or about 1300 nm or less. In some embodiments, the zero dispersion wavelength is from about 1290 nm to about 1380 nm. For example, the zero dispersion wavelength can be from about 1295 nm to about 1370 nm, or from about 1300 nm to about 1360 nm, or from about 1305 nm to about 1350 nm. For example, the zero dispersion wavelength can be about 1300 nm, about 1310 nm, about 1320 nm, about 1330 nm, about 1340 nm, about 1350 nm, about 1360 nm, about 1370 nm, or about 1380 nm.

Additionally, the attenuation of the optical fibers disclosed herein is less than or equal to about 0.40 dB/km at 1310 nm wavelength, less than or equal to about 0.35 dB/km at 1310 nm wavelength, or less than or equal to about 0.32 dB/turn at 1310 nm wavelength.

According to an aspect of the present disclosure, the optical fibers have a dispersion having an absolute value at 1310 nm in a range between about −6.0 ps/nm/km and about 1.0 ps/nm/km and a dispersion slope at 1310 nm in a range between about 0.015 ps/nm$^2$/km and 0.1 ps/nm$^2$/km. For example, the absolute value of the dispersion at 1310 nm is from about −5.5 ps/nm/km to about 0.8 ps/nm/km, or about −5.0 ps/nm/km to about 0.5 ps/nm/km, or about −4.5 ps/nm/km to about 0.2 ps/nm/km, or about −4.0 to about 0.1 ps/nm/km, or about −3.5 ps/nm/km to about 0.08 ps/nm/km, or about −3.0 ps/nm/km to about 0.05 ps/nm/km. For example, the absolute value of the dispersion at 1310 is about −5.5 ps/nm/km, or about −4.0 ps/nm/km, or about −3.8 ps/nm/km, or about −3.4 ps/nm/km, or about −2.8 ps/nm/km, or about 0.08 ps/nm/km. In some examples, the dispersion slope at 1310 nm is about 0.015 ps/nm$^2$/km to about 0.095 ps/nm$^2$/km, about 0.025 ps/nm$^2$/km to about 0.1 ps/nm$^2$/km, about 0.03 ps/nm$^2$/km to about 0.1 ps/nm$^2$/km, about 0.035 ps/nm$^2$/km to about 0.1 ps/nm$^2$/km, about 0.04 ps/nm$^2$/km to about 0.1 ps/nm$^2$/km, about 0.045 ps/nm$^2$/km to about 0.09 ps/nm$^2$/km.

According to an aspect of the present disclosure, the optical fibers have a dispersion at 1550 nm of less than about 22 ps/nm/km and a dispersion slope at 1550 nm of less than about 0.1 ps/nm$^2$/km. For example, the dispersion at 1550 nm is from about 10 ps/nm/km to about 22 ps/nm/km, or about 10 ps/nm/km to about 22 ps/nm/km, or about 10 ps/nm/km to about 20 ps/nm/km, or about 10 ps/nm/km to about 15 ps/nm/km, or about 15 ps/nm/km to about 22 ps/nm/km, or about 15 ps/nm/km to about 20 ps/nm/km. For example, the dispersion at 1550 is about 10 ps/nm/km, about 15 ps/nm/km, about 16 ps/nm/km, about 17 ps/nm/km, about 17.5 ps/nm/km, about 18 ps/nm/km, about 19 ps/nm/km, about 19.5 ps/nm/km, about 19.6 ps/nm/km, about 20 ps/nm/km, about 20.1 ps/nm/km, about 22 ps/nm/km, or any value between these values. In some examples, the dispersion slope at 1550 nm is about 0.04 $ps/nm^2/km$ to about 0.1 $ps/nm^2/km$, about 0.05 $ps/nm^2/km$ to about 0.1 $ps/nm^2/km$, about 0.055 $ps/nm^2/km$ to about 0.1 $ps/nm^2/km$, about 0.06 $ps/nm^2/km$ to about 0.1 $ps/nm^2/km$, about 0.08 $ps/nm^2/km$ to about 0.1 $ps/nm^2/km$, about 0.04 $ps/nm^2/km$ to about 0.08 $ps/nm^2/km$, about 0.05 $ps/nm^2/km$ to about 0.08 $ps/nm^2/km$, about 0.055 $ps/nm^2/km$ to about 0.08 $ps/nm^2/km$, about 0.06 $ps/nm^2/km$ to about 0.08 $ps/nm^2/km$, about 0.04 $ps/nm^2/km$ to about 0.06 $ps/nm^2/km$, about 0.05 $ps/nm^2/km$ to about 0.06 $ps/nm^2/km$, or about 0.055 $ps/nm^2/km$ to about 0.06

Exemplary Embodiments

Provided below are exemplary embodiments of the optical fibers disclosed herein along with a comparative example. The below exemplary embodiments are intended to be exemplary and are not intended to limit the scope of the disclosure.

Table 1 below provides five examples of multicore optical fibers in which each fiber comprises 4 cores are arranged in a 1×4 linear configuration. The optical fibers in Table 1 below each have an outer diameter of 125 microns. Exemplary Examples 2-3 in Table 1 below each have a relatively smaller mode field diameter than Comparative Example 1, thus providing lower cross talk between the adjacent cores.

TABLE 1

| | Comparative Example 1 | Exemplary Example 2 | Exemplary Example 3 | Exemplary Example 4 | Exemplary Example 5 |
|---|---|---|---|---|---|
| Core Maximum Relative Refractive Index, $\Delta_{1MAX}$ (%) | 0.35 | 0.7 | 0.65 | 0.6 | 0.6 |
| Core Radius, $r_1$, (microns) | 4.2 | 3 | 3.2 | 3.3 | 3.3 |
| Core Alpha | 12 | 12 | 12 | 12 | 12 |
| Inner Cladding Region Relative Refractive Index, $\Delta_2$ (%) | 0 | 0 | 0 | 0 | 0 |
| Inner Cladding Region Radius, $r_2$ (microns) | 8.8 | 8 | 8 | 8 | 8 |
| Depressed-Index Cladding Region Relative Refractive Index, $\Delta_{3MIN}$ (%) | −0.65 | −0.65 | −0.5 | −0.5 | −0.55 |
| Depressed-Index Cladding Region Radius, $r_3$ (microns) | 12 | 12 | 12 | 12 | 12 |
| Volume of Depressed-Index Cladding Region, $V_3$ (% $\Delta$ $micron^2$) | −43.26 | −52.00 | −40.00 | −40.00 | −44.00 |
| Outer Cladding Region Relative Refractive Index, $\Delta_4$ (%) | 0 | 0 | 0 | 0 | 0 |
| Cladding Region Radius, $r_4$ (microns) | 62.5 | 62.5 | 62.5 | 62.5 | 62.5 |
| Core to Core Spacing Between Centers of Cores (microns) | 26 | 26 | 26 | 26 | 26 |
| Mode Field Diameter at 1310 nm (micron) | 8.68 | 6.25 | 6.54 | 6.78 | 6.78 |
| Mode Field Diameter at 1550 nm (micron) | 9.65 | 7.11 | 7.4 | 7.67 | 7.66 |
| Effective Area at 1310 nm ($micron^2$) | 59.08 | 30.37 | 33.39 | 35.87 | 35.86 |
| Effective Area at 1550 nm ($micron^2$) | 72.03 | 38.46 | 41.80 | 44.86 | 44.81 |
| Cable Cutoff (nm) | 1189 | 1228 | 1228 | 1216 | 1228 |
| Zero Dispersion Wavelength (nm) | 1309.11 | 1376.59 | 1357.88 | 1351.02 | 1350.28 |
| Dispersion at 1310 nm (ps/nm/km) | 0.082 | −5.5004 | −4.022 | −3.5032 | −3.4564 |
| Dispersion Slope at 1310 nm ($ps/nm^2/km$) | 0.0921 | 0.0826 | 0.084 | 0.0854 | 0.0858 |
| Dispersion at 1550 nm (ps/nm/km) | 19.186 | 11.667 | 13.301 | 14.189 | 14.326 |
| Dispersion Slope at 1550 nm ($ps/nm^2/km$) | 0.0653 | 0.06015 | 0.0599 | 0.0612 | 0.0616 |
| Cross Talk at 1310 nm per 2 km Length of Fiber (dB) | −21.12 | −58.293 | −49.63 | −45.18 | −47.04 |
| Cross Talk at 1550 nm per 2 km Length of Fiber (dB) | −0.554 | −28.15 | −21.39 | −18.08 | −20 |

$ps/nm^2/km$. For example, the dispersion slope at 1550 nm is about 0.04 $ps/nm^2/km$, about 0.05 $ps/nm^2/km$, about 0.055 $ps/nm^2/km$, about 0.057 $ps/nm^2/km$, about 0.058 $ps/nm^2/km$, about 0.059 $ps/nm^2/km$, about 0.06 $ps/nm^2/km$, about 0.061 $ps/nm^2/km$, about 0.07 $ps/nm^2/km$, or about 0.08 $ps/nm^2/km$.

Table 2 below provides three exemplary embodiments of multicore optical fibers in which each fiber comprises 4 cores are arranged in a 1×4 linear configuration. The optical fibers in Table 2 below each have an outer diameter of 125 microns.

TABLE 2

| | Exemplary Example 6 | Exemplary Example 7 | Exemplary Example 8 |
|---|---|---|---|
| Core Maximum Relative Refractive Index, $\Delta_{1MAX}$ (%) | 0.6 | 0.55 | 0.55 |
| Core Radius, $r_1$, (microns) | 3.25 | 3.4 | 3.4 |
| Core Alpha | 12 | 12 | 12 |
| Inner Cladding Region Relative Refractive Index, $\Delta_2$ (%) | 0 | 0 | 0 |
| Inner Cladding Region Radius, $r_2$ (microns) | 8 | 8 | 8 |
| Depressed-Index Cladding Region Relative Refractive Index, $\Delta_{3MIN}$ (%) | −0.6 | −0.6 | −0.65 |
| Depressed-Index Cladding Region Radius, $r_3$ (microns) | 12 | 12 | 12 |
| Volume of Depressed-Index Cladding Region, $V_3$ (% Δ micron$^2$) | −48.00 | −48.00 | −52.00 |
| Outer Cladding Region Relative Refractive Index, $\Delta_4$ (%) | 0 | 0 | 0 |
| Cladding Region Radius, $r_4$ (microns) | 62.5 | 62.5 | 62.5 |
| Core to Core Spacing Between Centers of Cores (microns) | 26 | 26 | 26 |
| Mode Field Diameter at 1310 nm (micron) | 6.74 | 7.035 | 7.033 |
| Mode Field Diameter at 1550 nm (micron) | 7.64 | 7.94 | 7.93 |
| Effective Area at 1310 nm (micron$^2$) | 35.44 | 38.61 | 38.60 |
| Effective Area at 1550 nm (micron$^2$) | 44.47 | 48.15 | 48.08 |
| Cable Cutoff (nm) | 1219 | 1221 | 1232 |
| Zero Dispersion Wavelength (nm) | 1354.25 | 1343.03 | 1342.29 |
| Dispersion at 1310 nm (ps/nm/km) | −3.7964 | −2.89 | −2.8316 |
| Dispersion Slope at 1310 nm (ps/nm$^2$/km) | 0.0858 | 0.0875 | 0.0877 |
| Dispersion at 1550 nm (ps/nm/km) | 14.069 | 15.336 | 15.463 |
| Dispersion Slope at 1550 nm (ps/nm$^2$/km) | 0.0622 | 0.0632 | 0.0635 |
| Cross Talk at 1310 nm per 2 km Length of Fiber (dB) | −48.85 | −44.32 | −46.11 |
| Cross Talk at 1550 nm per 2 km Length of Fiber (dB) | −21.31 | −17.93 | −20 |

Table 3 below provides three exemplary embodiments of multicore optical fibers in which each fiber comprises 4 cores are arranged in a 1×4 linear configuration. The optical fibers in Table 3 below each have an outer diameter of 125 microns.

TABLE 3

| | Exemplary Example 9 | Exemplary Example 10 | Exemplary Example 11 |
|---|---|---|---|
| Core Maximum Relative Refractive Index, $\Delta_{1MAX}$ (%) | 0.84 | 0.4 | 0.36 |
| Core Radius, $r_1$, (microns) | 2.85 | 4 | 3.9 |
| Core Alpha | 12 | 12 | 12 |
| Inner Cladding Region Relative Refractive Index, $\Delta_2$ (%) | 0 | 0 | 0 |
| Inner Cladding Region Radius, $r_2$ (microns) | 8 | 7.5 | 8 |
| Depressed-Index Cladding Region Relative Refractive Index, $\Delta_{3MIN}$ (%) | −0.65 | −0.65 | −0.65 |
| Depressed-Index Cladding Region Radius, $r_3$ (microns) | 12 | 12 | 12 |
| Volume of Depressed-Index | −52 | −57 | −52 |

TABLE 3-continued

| | Exemplary Example 9 | Exemplary Example 10 | Exemplary Example 11 |
|---|---|---|---|
| Cladding Region, $V_3$ (% Δ micron$^2$) | | | |
| Outer Cladding Region Relative Refractive Index, $\Delta_4$ (%) | 0 | 0 | 0 |
| Cladding Region Radius, $r_4$ (microns) | 62.5 | 62.5 | 62.5 |
| Core to Core Spacing Between Centers of Cores (microns) | 26 | 26 | 26 |
| Mode Field Diameter at 1310 nm (micron) | 5.76 | 8.07 | 8.39 |
| Mode Field Diameter at 1550 nm (micron) | 6.56 | 8.88 | 9.29 |
| Effective Area at 1310 nm (micron$^2$) | 26.11 | 51.58 | 54.26 |
| Effective Area at 1550 nm (micron$^2$) | 32.81 | 61.69 | 66.28 |
| Cable Cutoff (nm) | 1239 | 1245 | 1173 |
| Zero Dispersion Wavelength (nm) | 1379 | 1302.34 | 1307.57 |
| Dispersion at 1310 nm (ps/nm/km) | −5.475 | 0.712 | 0.226 |
| Dispersion Slope at 1310 nm (ps/nm$^2$/km) | 0.079 | 0.093 | 0.0932 |
| Dispersion at 1550 nm (ps/nm/km) | 9.95 | 19.927 | 19.54 |
| Dispersion Slope at 1550 nm (ps/nm$^2$/km) | 0.0555 | 0.0653 | 0.0658 |
| Cross Talk at 1310 nm per 2 km Length of Fiber (dB) | −79.36 | −46.78 | −37 |
| Cross Talk at 1550 nm per 2 km Length of Fiber (dB) | −47.01 | −22.69 | −15.35 |

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multicore optical fiber comprising:
four cores arranged in a linear configuration such that a centerline of each core is arranged along axis A,
the centerline of each core being spaced from the centerline of an adjacent core by a distance x of about 30 microns or less, and
each core having a relative refractive index $\Delta_1$; and
a cladding surrounding each of the four cores, the cladding comprising:
an inner cladding region with a relative refractive index $\Delta_2$,
a depressed-index cladding region with a relative refractive index $\Delta_3$ and a volume $V_3$ of 20% Δmicron$^2$ or greater, and
an outer cladding region with a relative refractive index $\Delta_4$,
wherein:
$\Delta_1 > \Delta_2 > \Delta_3$ and $\Delta_1 > \Delta_4 > \Delta_3$,
the multicore optical fiber has an outer diameter of about 125 microns or less,
each core of the four cores has a mode field diameter, at a wavelength of 1310 nm, of about 8.07 microns or less,
each core of the four cores has a cable cutoff of about 1260 nm or less, and cross talk between adjacent cores of the four cores is about −18 dB or less at wavelengths of 1310 nm and 1550 nm per 2 km fiber length.

2. The multicore optical fiber of claim 1, wherein the distance x is between about 22 microns and about 28 microns.

3. The multicore optical fiber of claim 2, wherein the distance x is between about 24 microns and about 26 microns.

4. The multicore optical fiber of claim 1, wherein a centerline of the multicore optical fiber is positioned along the axis A.

5. The multicore optical fiber of claim 1, wherein the four cores are arranged in a linear 1×4 configuration.

6. The multicore optical fiber of claim 1, wherein each core of the four cores has a mode field diameter, at a wavelength of 1310 nm, of about 8.0 microns or less.

7. The multicore optical fiber of claim 1, wherein an effective area of the multicore optical fiber, at a wavelength of 1310 nm, is about 55.0 $micron^2$ or less.

8. The multicore optical fiber of claim 1, wherein an effective area of the multicore optical fiber, at a wavelength of 1550 nm, is about 30 $micron^2$ or greater.

9. The multicore optical fiber of claim 1, wherein a minimum distance y between the centerline of an outermost core of the four cores and an outer diameter of the cladding is between about 15 microns and about 30 microns.

10. The multicore optical fiber of claim 9, wherein the minimum distance y is between about 22 microns and about 26 microns.

11. The multicore optical fiber of claim 1, wherein the cross talk between adjacent cores of the four cores is about −20 dB or less at wavelengths of 1310 nm and 1550 nm per 2 km fiber length.

12. The multicore optical fiber of claim 11, wherein the cross talk between adjacent cores of the four cores is about −25 dB or less at wavelengths of 1310 nm and 1550 nm per 2 km fiber length.

13. The multicore optical fiber of claim 12, wherein the cross talk between adjacent cores of the four cores is about −30 dB or less at wavelengths of 1310 nm and 1550 nm per 2 km fiber length.

14. The multicore optical fiber of claim 13, wherein the cross talk between adjacent cores of the four cores is about −50 dB or less at wavelengths of 1310 nm and 1550 nm per 2 km fiber length.

15. The multicore optical fiber of claim 14, wherein the cross talk between adjacent cores of the four cores is about −55 dB or less at wavelengths of 1310 nm and 1550 nm per 2 km fiber length.

16. The multicore optical fiber of claim 1, wherein the cable cutoff of each core is about 1240 nm or less.

17. The multicore optical fiber of claim 16, wherein the cable cutoff of each core is about 1230 nm or less.

18. The multicore optical fiber of claim 1, wherein the cladding comprises a marker that is not located on a line of symmetry of the multicore optical fiber.

19. The multicore optical fiber of claim 1, wherein an alpha value of each core is about 10 or greater.

20. The multicore optical fiber of claim 1, wherein the volume $V_3$ is about 40% $\Delta micron^2$ or greater.

* * * * *